United States Patent [19]

Chamberlain

[11] 3,972,398

[45] Aug. 3, 1976

[54] PARKING BRAKE AND TRANSMISSION VALVE INTERLOCK

[75] Inventor: Richard W. Chamberlain, Aurora, Ill.

[73] Assignee: Caterpillar Tractor Co., Peoria, Ill.

[22] Filed: Apr. 17, 1975

[21] Appl. No.: 568,952

[52] U.S. Cl. .............................. 192/4 A; 192/114 R; 251/94
[51] Int. Cl.² .................................... F16H 57/10
[58] Field of Search .............. 192/4 A, 13 R, 114 R, 192/3 T

[56] References Cited
UNITED STATES PATENTS

| | | | |
|---|---|---|---|
| 2,299,475 | 10/1942 | Farmer | 192/4 A |
| 3,635,317 | 1/1972 | Crabb et al. | 192/4 A |
| 3,753,478 | 8/1973 | Shiber | 192/114 X |

*Primary Examiner*—Benjamin W. Wyche
*Attorney, Agent, or Firm*—Phillips, Moore, Weissenberger, Lempio & Strabala

[57] ABSTRACT

A parking brake interlock system includes detent means responsive to a loss of pressure in the brake-releasing hydraulic pressure system for causing the detent mechanism to engage and resist movement of a transmission control member of the vehicle transmission.

9 Claims, 4 Drawing Figures

PARKING BRAKE AND TRANSMISSION VALVE INTERLOCK

BACKGROUND OF THE INVENTION

Safety laws generally require that large machines such as earth-moving machines and vehicles be equipped with some form of automatic parking brake to prevent the vehicle from moving or rolling down an incline or the like when the machine is unattended or not in operation. Such machines are usually equipped with spring-applied brakes which are automatically applied when the vehicle is shut down or there is a loss of control pressure within the vehicle. These brake systems are also normally responsive to the control pressure of the vehicle to automatically release upon starting of the vehicle and the control pressure coming up to a predetermined level.

One problem with such systems is, however, that the parking brakes are normally for emergency use only and are generally not sufficiently powerful to prevent the vehicle engine from moving the vehicle. Thus, if the operator should fail to release the brake or if the control pressure of the vehicle should not attain a level sufficiently high to completely release the brakes, movement of the vehicle can then damage the brakes and render them substantially ineffective.

SUMMARY AND OBJECTS OF THE INVENTION

It is a primary object of the present invention to overcome the above problems of the prior art.

A further object of the present invention is to provide a parking brake interlock system that is responsive to a failure in the release means of the parking brake to indicate to an operator that the brakes have not been released.

A further object of the present invention is to provide parking brake interlock means that is responsive to a failure to release the parking brakes to provide an increased resistance to control of the vehicle transmission.

In accordance with the primary aspect of the present invention, a parking brake interlock system is provided with pressure-responsive means responsive to failure of a source of pressure for releasing the brakes to apply a resistance to movement of the vehicle transmission controls from the neutral position.

BRIEF DESCRIPTION OF THE DRAWINGS

The above and other objects and advantages of the present invention will become apparent from the following specification when read in conjunction with the drawings, wherein.

DETAILED DESCRIPTION OF PREFERRED EMBODIMENT

Figure 1:
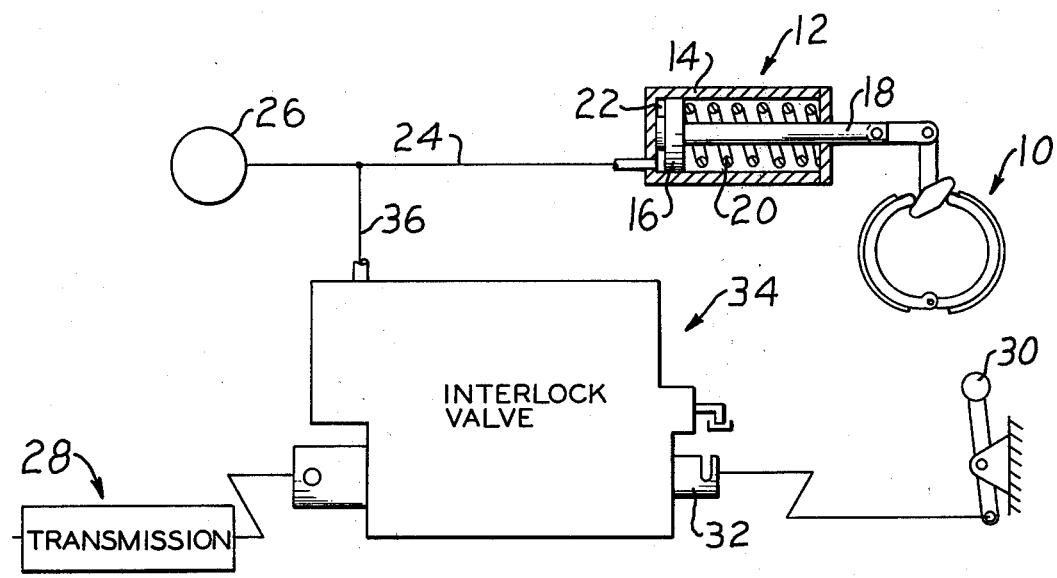
FIG. 1 is a schematic layout of a brake and transmission control system incorporating the present invention.

Turning now to FIG. 1 of the drawings, there is illustrated a schematic layout of a vehicle brake system and a transmission control system incorporating an interlock assembly in accordance with the present invention. As illustrated therein, a vehicle brake system includes the usual friction means schematically indicated generally at 10 having suitable spring-actuating means generally indicated at 12 for automatically actuating the brakes. The brake-actuating means comprises a cylinder 14 having a piston 16 reciprocally mounted therein with a piston rod 18 or other suitable control means connected by suitable linkage to the friction means 10. A spring 20 mounted within the cylinder 14 acts on the piston 16 to bias the piston to one end of the cylinder 14 and thereby engage the brakes of the system.

In the illustrated embodiment the brakes are released by means of suitable pressurized fluid being introduced in a suitable manner into a chamber 22 formed at the head end of piston 16 within the cylinder 14. Fluid is introduced into the chamber 22 by suitable conduit means 24 from a suitable source such as a pump or the like 26. A source of pressurized fluid may be from any suitable source of fluid on the vehicle such as transmission control or implement control. Alternately the brake system may have its own fluid control system. The pressurized fluid may be any suitable type of fluid such as hydraulic or it may be a pressurized gas such as air.

The transmission control system of the vehicle is schematically illustrated as comprising a transmission which may be of any suitable type generally schematically illustrated at 28 interconnected with a suitable control member 30 be means of suitable linkage system including a control member 32. An interlock assembly indicated generally at 34 interconnects the above-described brake control system and the transmission control system.

Pressurized fluid from the brake control system is communicated by suitable conduit means 36 to the interlock assembly 34 for acting on pressure-responsive means within the interlock system, as will be described below.

The interlock assembly includes a housing 38 having a first cylindrical bore 40 formed therein for reciprocally receiving a control member 32. The control member 32 may be of any suitable configuration but is preferably of a substantially cylindrical configuration including an enlarged cylindrical portion 42 and an adjacent reduced cylindrical portion 44 on which is mounted in slidable relation a sleeve 46. The sleeve 46 includes an annular groove 48 formed on the outer diameter thereof and is biased to a center position between shoulders 50 formed between diameters 42 and 44 and shoulder 52 formed on a collar or ring 54 mounted on a cylindrical portion 44 of member 32 and held in place by suitable means such as a retaining ring 56.

The sleeve member 46 is biased to its center position between the shoulders 50 and 52 by suitable means such as compression springs 58 and 60 which abut the shoulders 50 and 52 and shoulders formed on the sleeve 46. A second cylindrical bore 62 is formed in housing 38 substantially parallel to the first bore 40 and reciprocally mounts a reciprocating plunger 64 having an inclined annular surface 66 formed thereon for defining camming means. The plunger or spool 64 is biased to its leftmost position by suitable means such as a spring 68 which is preferably of the compression type and engages one end of the spool 64 and at the other end engages a suitable plug or cap member 70 within or closing the bore 62. A suitable slug of a substantially cylindrical configuration defining suitable piston means 72 is mounted within a reduced-diameter cylindrical bore concentric with the bore 62 and engages a leftward end of spool member 64. One end of the piston or slug 72 extends into pressure chamber 76 formed at the left end of the bore 74 to which is communicated pressurized fluid by way of conduit means 36.

Figure 2:
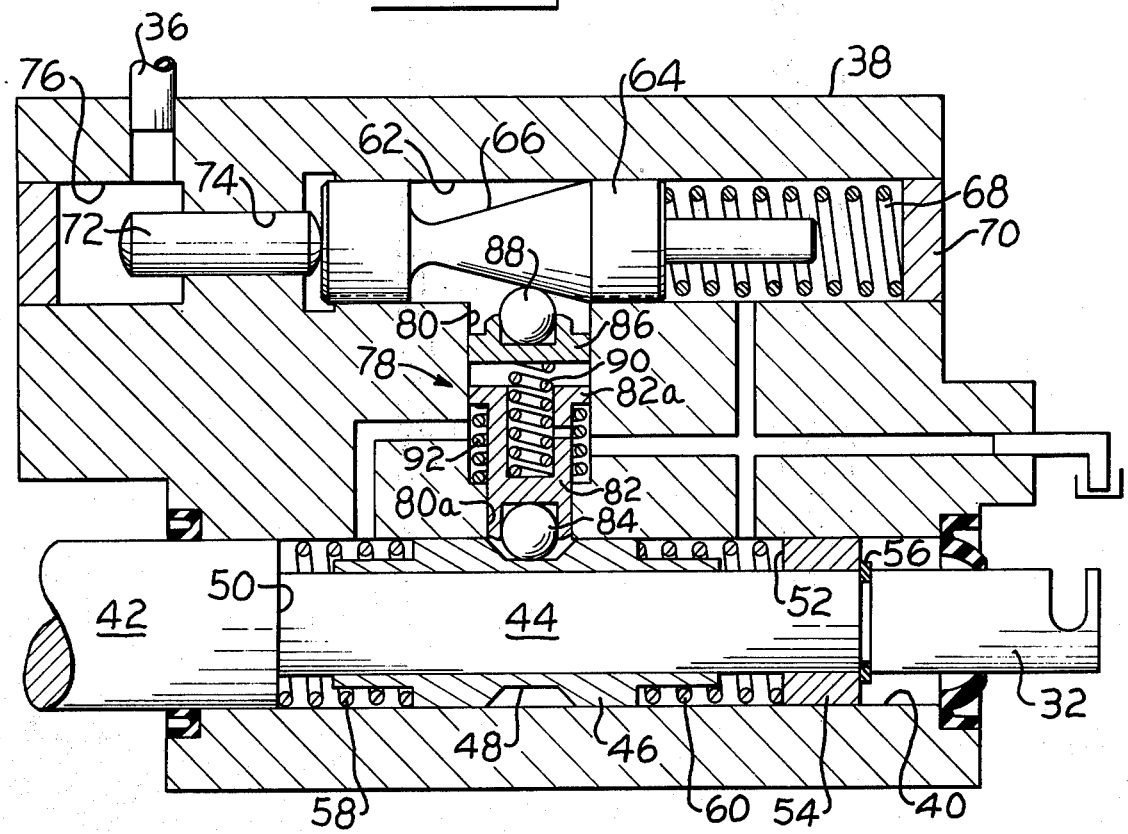
FIG. 2 is an elevational view in section of an interlock mechanism in accordance with the present invention showing the interlock in the locked position.

A lost-motion plunger indicated generally by the numeral 78 is mounted between the spool 64 and the control member 32 within a bore 80 extending therebetween. The plunger 78 includes a first body portion 82 reciprocally mounted in a reduced-diameter portion of bore 80a and includes suitable means such as a ball 84 at the lower end thereof for engaging annular groove 48. A second body portion 86 of the plunger is reciprocally mounted above the portion 82 and includes a suitable means such as a ball 88 for engaging the camming surface 66 on the spool 64 and defining suitable follower means for plunger 78. Suitable spring means such as a compression spring 90 is mounted between the plunger members 82 and 86 for separating them and biasing them apart as illustrated in FIG. 2. This, in combination with the shoulder portions defined by the ends of the respective members 82 and 86, define lost-motion link means as specified above. Thus the plunger member 82 may move upward toward the member 86 against the bias of spring 90 until abutting engagement of the ends thereof occurs.

A second spring 92 is disposed between the end of bore 80 wherein a shoulder is defined between the bore 80 and reduced portion 88 and a shoulder defined by a flange 82a on member 82 for biasing the member 82 upward away from the annular groove 48 formed in sleeve 46 mounted on the control member 32. The spring 92 is of a lesser strength than that of spring 90 so that spring 90 may bias member 82 downward abainst the bias of spring 92.

It is believed that the operation of the present invention will be apparent from the above description. However, the operation is more clearly illustrated by FIGS. 2 through 4 which show the operative positions of the members of the present interlock assembly. As will be appreciated from a view of FIG. 1, when pressurized fluid is introduced into chamber 22 sufficient to move piston 16 to the right, brakes 10 will be released to permit the vehicle to move freely. However, should the pressure fail to come up to such a value, pressure introduced by way of conduit 36 into chamber 76, as shown in FIG. 2, will not be sufficient to move the plunger or spool 64 to the right to permit movement of the plunger 78 upward. Thus, the plunger 78 will stay in a position as shown in FIG. 2 under the camming action of spool 64 and thus the lower detent apparatus 84 will engage slot or annular groove 48 as shown in FIG. 2. With the spool or control member 32 shown in its neutral position, the detent means 84 will be engaged in annular slot 48 as shown. However, should the operator attempt to shift the control lever 30 to move the control member 32 from its neutral position, the detent means will impose a resisiting force to resist movement of the control member 32 in a direction from its neutral position as shown. This resistance to movement will indicate to the operator of the vehicle that the brakes have not been released and thus he will have an opportunity to check the system and release the brake or check the system for repairs.

The detent mechanism, however, is such that it will permit the operator to move the control member 32 in either direction against the bias of either spring 58 or 60 to shift the transmission into drive and move the vehicle should it become necessary to do so. Thus, when sufficient force is applied to the control member 32 to move it relative to sleeve 46 from the neutral position, the machine can be moved so long as the transmission lever is held into engaged position. As soon as the lever 30 is released, one of springs 58 and 60 will bias control member 32 to the neutral position as in FIG. 2. This permits the machine to be moved out of the way or to a shop for repair.

Figure 3:
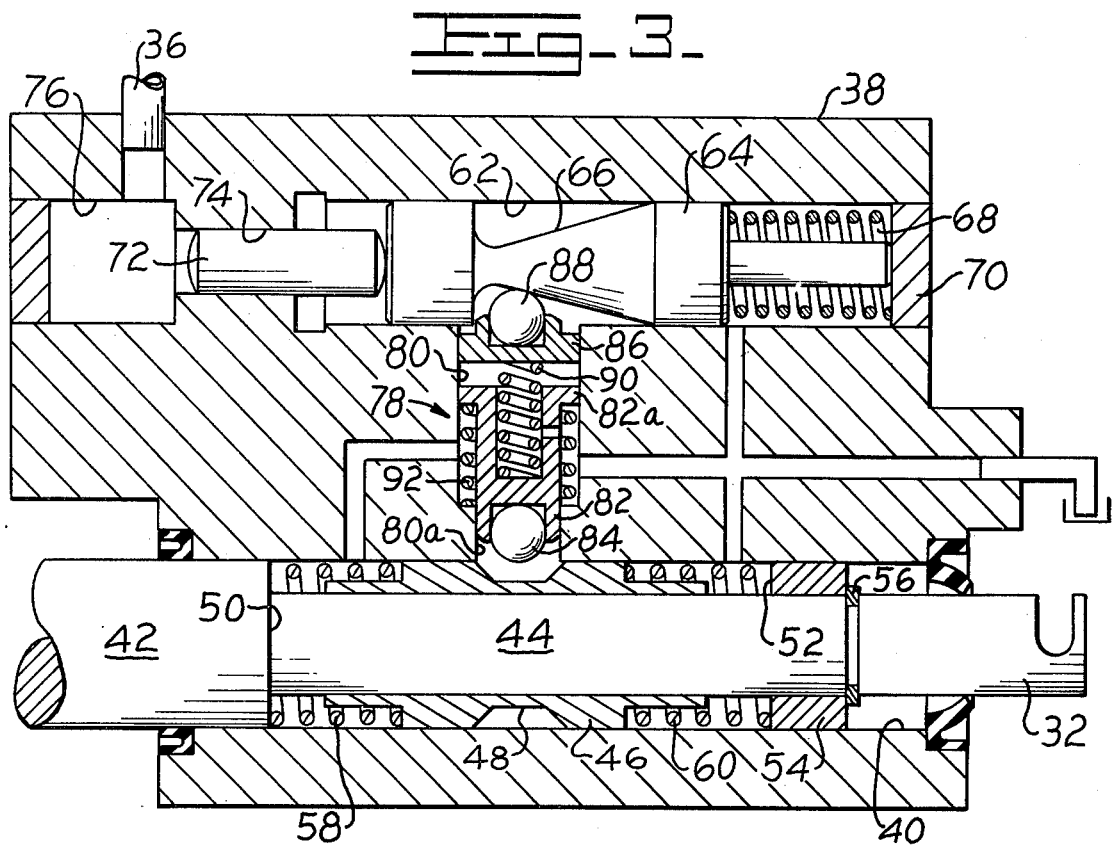
FIG. 3 is a view like FIG. 2 showing the interlock mechanism in the fully released position.

Should sufficient pressure be developed in the pressure system 26 and 12 to release brakes 10 the pressure thereof communicated by way of lines 36 into chamber 76 (FIG. 3) will act on slug or piston 72 and move it to the right, along with the spool 64. This will move the cam surface 66 to the right away from the follower portion 88 of line 78 and permit the spring 92 to move the plunger 78 upwards, as best seen in FIG. 3, out of engagement with the annular groove 48 and thus permit free movement of the control member 32 from its neutral position. Thus, when sufficient pressure exists within the system to release the brake system, the pressure-responsive detent means will be responsive to that pressure to pull away from the control member 32 and permit normal shifting of the transmission controls of the vehicle. However, as pointed out above, should that pressure fail to be sufficient to release the brakes, the pressure will be insufficient to pull the detent means away from the control member 32 so that a resistance to movement of the control member will be felt by the operator, indicating a failure of the brake-releasing system.

Figure 4:
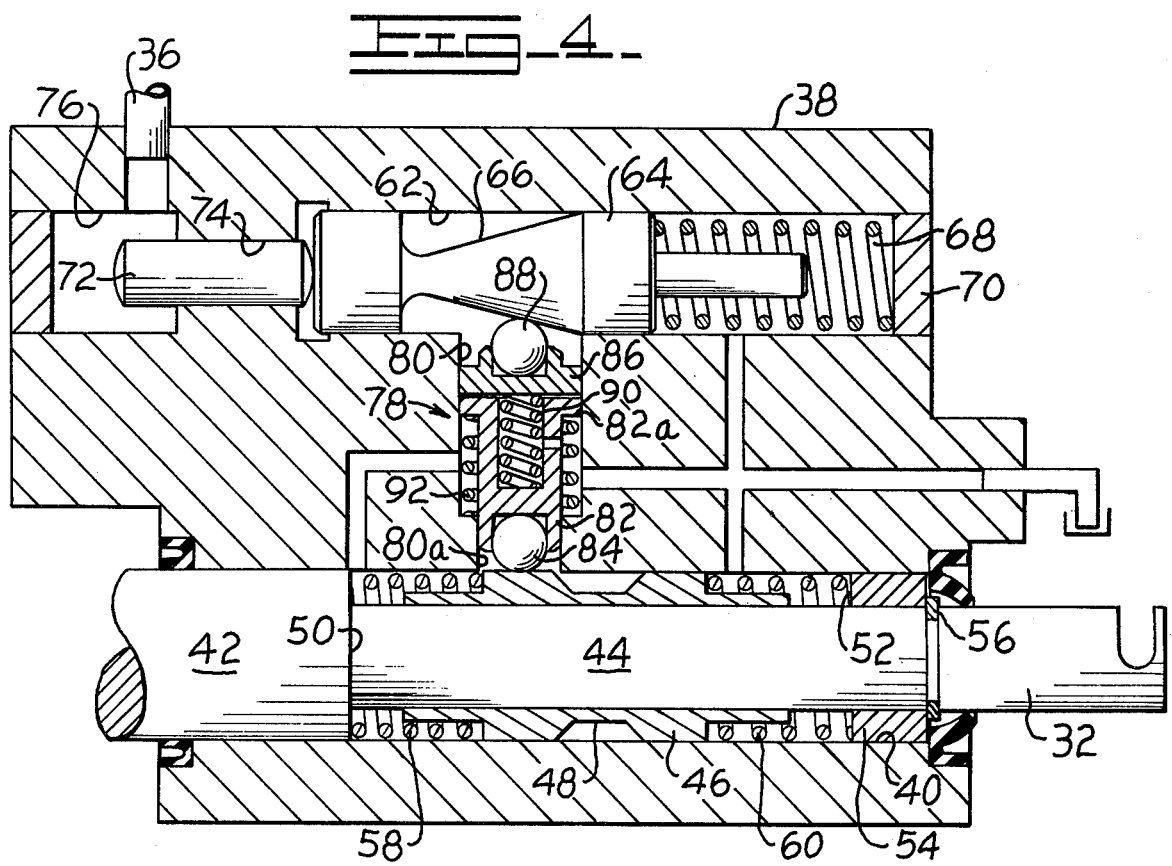
FIG. 4 is a view like FIG. 2 showing the interlock overridden by the transmission controls.

Should the brake-releasing pressure system fail during operation of the vehicle after it has been shifted into a position out of neutral as shown in FIG. 4, the spool 64 will move to the left against plunger or piston 72 and cam the link means 78 or lost-motion plunger 78 downward against the outer diameter of sleeve 46 as best seen in FIG. 4. In this situation it will be necessary then for the vehicle to be shifted to the neutral position before the pressure-responsive detent means acts to resist shifting of the system to indicate to the operator that the brake system release means has failed.

Thus, from the above description it is seen that I have provided a parking brake interlock system that cooperates with the transmission control means and is pressure-responsive to a failure of the source of pressure for releasing the brakes to impose a resistance on the movement of the transmission control means.

What is claimed is:

1. A parking brake and transmission interlock system comprising:
a transmission control member movable from a first composition to at least a second position;
a parking brake release system comprising a source of pressurized fluid; and
pressure-responsive means responsive to a failure of said source of pressure to maintain a predetermined pressure for imposing a resistance to the movement of said transmission control member from said first position,
said pressure-responsive means comprises pressure-responsive detent means responsive to a decrease in said source pressure to increase detent pressure and responsive to an increase in source pressure to reduce said detent pressure, said detent means comprises camming means mounted adjacent said control member, depression means carried by said control member, and a plunger extending between said camming means and said control member for engagement with said depression when said control member is in said first position and said pressure fails.

2. The interlock system of claim 1 wherein:

said transmission control member comprises an elongated reciprocably mounted cylindrical member; and said depression means comprises a sleeve slidably mounted on said control member between a pair of spaced shoulder members, biasing means disposed between said sleeve and said shoulders for biasing said sleeve to a central position between said shoulders, and an annular groove formed on the outer surface of said sleeve.

3. The interlock system of claim 2 comprising:

a housing having first and second adjacent parallel bores;

a third bore extending between and communicating with said first and second bores;

said camming means mounted in said first bore;

said control member mounted in said second bore; and said plunger mounted in said third bore.

4. The interlock system of claim 3 wherein:

said camming means comprises an elongated camming member reciprocably mounted in said bore and including a substantially conical camming surface extending axially of said bore;

spring means for biasing said camming member in a first direction in said bore for camming said plunger toward said control member; and fluid-responsive piston means for biasing said camming member in a second direction for permitting said plunger to move away from said control member.

5. The interlock system of claim 4 wherein:

said plunger comprises first and second plunger members reciprocably mounted in said third bore;

spring means disposed between said first and second plunger members for biasing said members respectively into engagement with said camming member and said sleeve on said control member.

6. The interlock system of claim 5 wherein:

said plunger members are spaced apart for permitting said second plunger member to be biased out of said annular groove and into engagement with said sleeve axially of said groove.

7. The interlock system of claim 2 wherein said plunger maintains engagement with said annular groove upon failure of said source of pressure; and said biasing means resists movement of said control member relative to said sleeve and biases said control member toward said central position.

8. The interlock system of claim 4 wherein a neutral position is defined by said control member when said sleeve is in said central position and said plunger is in alignment with said annular groove;

said plunger engages said annular groove upon failure of said source of pressure when said central member is in said neutral position, and maintains engagement with said groove thereafter upon movement of said control member in either direction from said neutral position; and said biasing means biases said control member toward said neutral position.

9. A parking brake and transmission interlock system comprising:

a housing having first and second parallel bores formed therein;

a transmission control member reciprocably mounted in one of said bores and movable from a first position to at least a second position;

a parking brake release system comprising a source of pressurized fluid; and pressure-responsive means responsive to a failure of said source of pressure to maintain a predetermined pressure for imposing a resistance to the movement of said transmission control member from said first position, said pressure-responsive means comprising a camming member mounted in the other of said bores, detent means normally biased by said camming member for engagement of said control member for resisting movement thereof, and piston means responsive to pressure from said source for biasing said camming means away from said detent means for permitting said detent means to disengage from said control member.

* * * * *